(No Model.)  2 Sheets—Sheet 1.

H. PASHLEY.
ASH CHUTE.

No. 311,674. Patented Feb. 3, 1885.

Witnesses:
Arthur C. Webb.
Geo. G. Jewett.

Inventor:
Henry Pashley
By his Attorney
Ernest ...

(No Model.) 2 Sheets—Sheet 2.
H. PASHLEY.
ASH CHUTE.
No. 311,674. Patented Feb. 3, 1885.
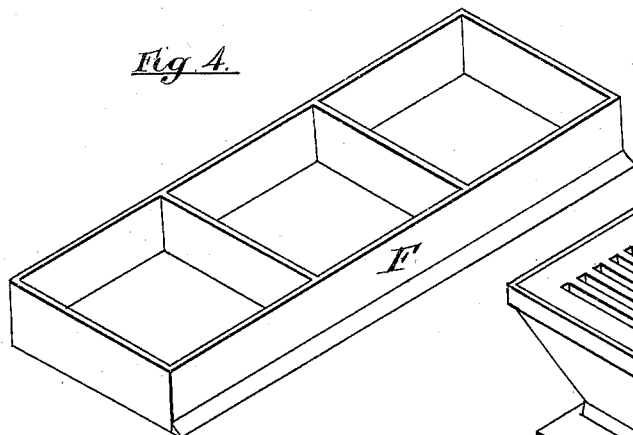
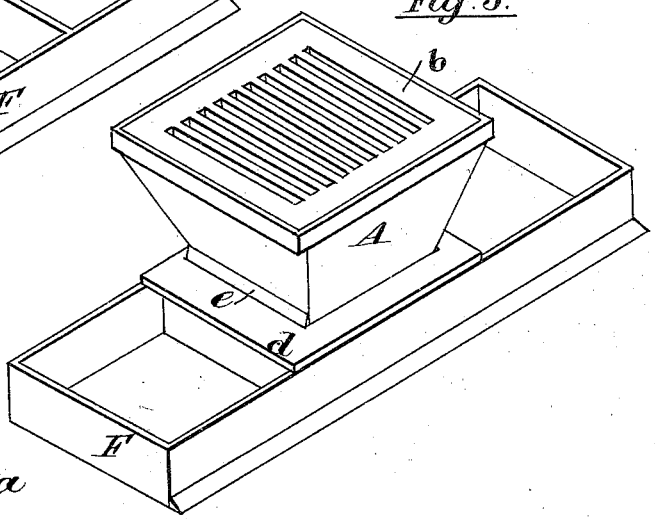
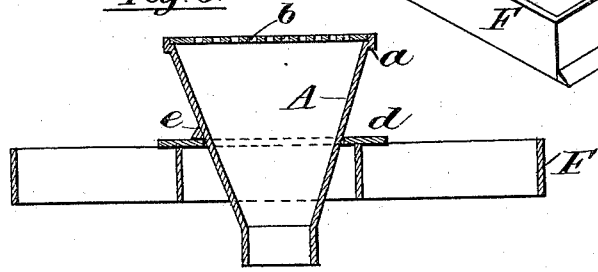
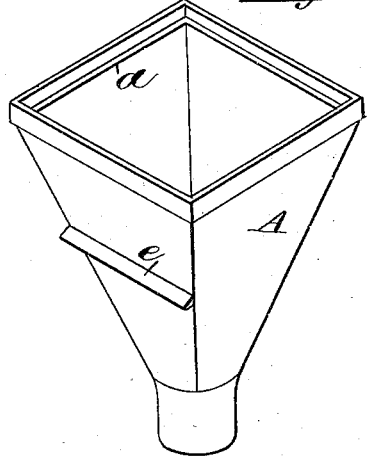
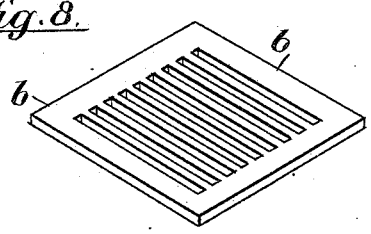
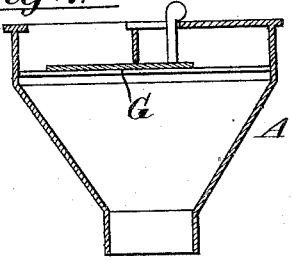
Witnesses:
Arthur C. Webb
Geo. G. Jewett
Inventor:
Henry Pashley
By his Attorney
Ernest C. Webb

UNITED STATES PATENT OFFICE.

HENRY PASHLEY, OF BROOKLYN, NEW YORK.

ASH-CHUTE.

SPECIFICATION forming part of Letters Patent No. 311,674, dated February 3, 1885.

Application filed April 11, 1884. (No model.)

*To all whom it may concern:*

Be it known that I, HENRY PASHLEY, a citizen of the United States, residing at Brooklyn, in the county of Kings and State of New York, have invented certain new and useful Improvements in Ash-Chutes, of which the following is a full, clear, and exact description.

The invention consists in the improvements in chutes for conveying ashes from beneath the fire-grate or stove to a receptacle in a cellar or other distant place, hereinafter particularly set forth and claimed.

To enable others skilled in the art to make and use my said invention, I will now proceed to describe the same with reference to the accompanying drawings, in which—

Figure 1:
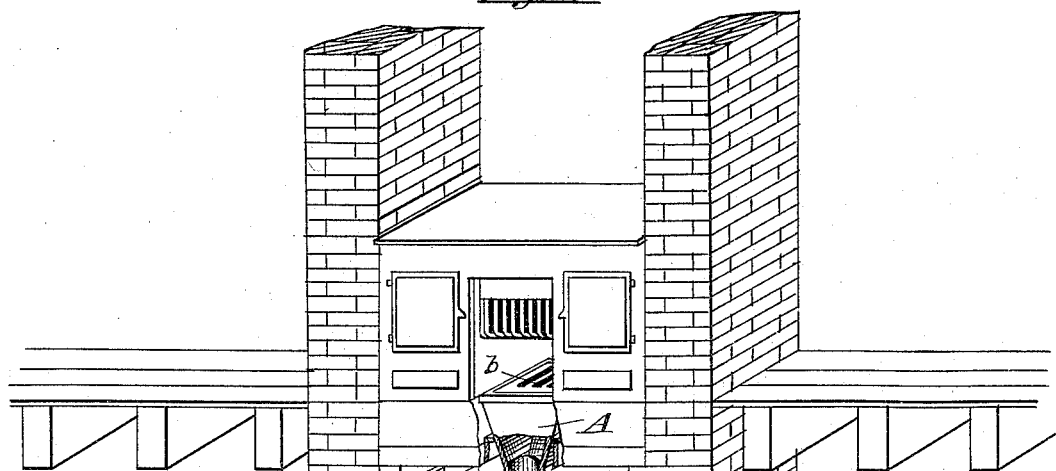
Figure 2:
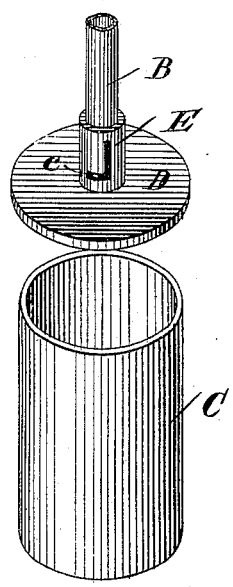
Figure 3:
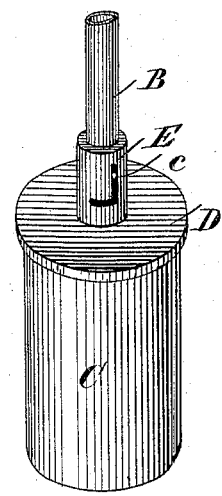

Figure 1 is a perspective view of piers and fire-place, the connected ash chute and can being in section. Fig. 2 is a perspective view of the ash can or receptacle, its cover, and a portion of the tube, the cover being shown raised above the can. Fig. 3 is a similar view with the cover lowered onto the can. Fig. 4 is a detail in perspective of the frame for supporting the chute. Fig. 5 is a perspective view of the frame with the chute in position, and Fig. 6 a sectional view thereof. Fig. 7 is a detail of the chute with its grate removed, and Fig. 8 is a plan view of the grate. Fig. 9 is a sectional view of a modification of the chute intended for use with grates.

Similar letters of reference designate corresponding parts in all the figures.

A designates the body of my ash-chute, which, as before stated, is funnel-shaped in cross-section. Its upper end is open and slightly below the edge is provided with an interior shoulder, *a*, upon which a grate, *b*, or sifter rests. The lower end is also open, but is contracted and preferably tubular in form, so that it can be connected to the upper end of a tube or pipe, B, which may be of any desired length; but I prefer to make it of a length sufficient to extend down into the cellar to such a distance above the cellar-floor that an ash-can, C, or other like receptacle can be conveniently placed or removed from under the lower end of this tube B, which is also open.

D designates the cover of the ash-can. This cover is provided with an upwardly-extending open-ended sleeve, E, the lower end of which is fastened to the cover at the edges of an opening therein. This sleeve is provided with an ⌐-shaped slot, and the lower end of the tube B, which fits into the sleeve, is provided with a pin, *c*, engaging with said slot, so that when the cover is raised and turned to bring the pin into the lower portion of the slot the cover will be held up above the can, as shown in Fig. 2, and when the cover is turned in reverse direction the pin will bear in the upper portion of the slot, as shown in Fig. 3, and the cover will then be in position to rest upon and close the can.

To support my ash-chute and hold it in place I employ a frame, F, partitioned to form three openings, as shown, so that the ash-chute may be inserted into either one, as the construction of the building or the direction in which it is to extend may require. This frame is to be placed between the piers that support the chimney resting upon a course of projecting bricks, as shown in Fig. 1. A collar, *d*, is placed upon the frame, resting upon the edges of the opening therein, into which the body A of the ash-chute is to be placed. Care must be taken in placing the frame in position to bring one of its openings directly in line with and under the grate of the heater or range. The body A is inserted into this opening, a small flange or exterior shoulder, *e*, resting upon the collar *d*. The tube B is then connected to the lower end of the body A, and the lower end of the tube B is connected to the cover D in the manner described, and the apparatus is then complete and ready for use. When ashes fall from the heater or range they will fall upon the grate *b*, and thence through the chute to the can C. Partially-burned coals or cinders too large to pass through the grate can be removed, if desired, or the grate can be lifted up, so that the whole mass will pass down through the chute.

When fire-places of the kind known as "grates" are used, I prefer to employ a chute with a smaller upper opening, adapted to be entirely closed by a sliding plate, G, as shown in the modification, Fig. 9.

The various parts of which my ash-chute is constructed may be made of cast or wrought iron.

What I claim as my invention, and desire to secure by Letters Patent, is—

1. In an ash-chute having a body, A, and tube or pipe B, arranged and connected in the manner described, a cover, D, for the ash-receptacle, provided with an upwardly extending sleeve, E, slotted to engage with a pin on the tube B, whereby the cover can be held above or lowered onto the ash-receptacle, substantially as herein shown and set forth.

2. The partitioned frame F, adapted to be arranged beneath the fire-grate or stove, substantially as shown and described, to receive the upper end or body portion, A, of the chute, having the pipe B leading to a distant ash-can, as set forth.

3. The partitioned frame F, arranged beneath a fire-grate or stove, combined with the collar or plate $d$, resting on the top of said frame F, the said collar or plate having an opening adapted to receive the upper or enlarged end, A, of the chute, substantially as shown.

In testimony whereof I have hereunto set my hand this 10th day of April, A. D. 1884.

HENRY PASHLEY.

Witnesses:
ARTHUR C. WEBB,
ERNEST C. WEBB.